United States Patent
Lipcsei (10) Patent No.: US 8,179,105 B2
(45) Date of Patent: May 15, 2012

(54) SYSTEMS AND METHODS FOR CONTROLLING OUTPUT CURRENTS OF POWER CONVERTERS

(75) Inventor: Laszlo Lipcsei, Campbell, CA (US)

(73) Assignee: O2Micro, Inc, Santa Clara, CA (US)

( * ) Notice: Subject to any disclaimer, the term of this patent is extended or adjusted under 35 U.S.C. 154(b) by 388 days.

(21) Appl. No.: 12/435,537

(22) Filed: May 5, 2009

(65) Prior Publication Data

US 2009/0273326 A1    Nov. 5, 2009

Related U.S. Application Data

(60) Provisional application No. 61/126,446, filed on May 5, 2008.

(51) Int. Cl.
*G05F 1/613* (2006.01)
(52) U.S. Cl. ........................ 323/224; 323/283
(58) Field of Classification Search ............ 323/224, 323/283, 284
See application file for complete search history.

(56) References Cited

U.S. PATENT DOCUMENTS

| 6,366,070 B1 * | 4/2002 | Cooke et al. | 323/284 |
| 6,396,252 B1 * | 5/2002 | Culpepper et al. | 323/285 |
| 7,161,333 B2 * | 1/2007 | Soch | 323/224 |
| 7,456,624 B2 * | 11/2008 | Sheng et al. | 323/285 |

* cited by examiner

*Primary Examiner* — Shawn Riley (57) ABSTRACT

A power converter can include a high-side switch coupled to a power supply terminal and selectively coupled to ground via a conduction path. During an on state duration, the high-side switch can be enabled and the conduction path can be disabled. During an off state duration, the high-side switch can be disabled and the conduction path can be enabled. During a skip state duration, the high-side switch and the conduction path both can be disabled. A controller coupled to the high-side switch can control the on state duration and the skip state duration based on a current reference. The controller can further generate a first control signal for controlling the high-side switch and the conduction path according to the on state duration and the skip state duration, and adjust an output current of the power converter to the current reference according to the first control signal.

23 Claims, 6 Drawing Sheets

SYSTEMS AND METHODS FOR CONTROLLING OUTPUT CURRENTS OF POWER CONVERTERS

RELATED APPLICATION

This application claims priority to U.S. Provisional Application No. 61/126,446, filed on May 5, 2008, which is hereby incorporated by reference in its entirety.

BACKGROUND

Some conventional chargers, e.g., switch mode battery chargers, control a charging current by monitoring a current through a current sensor. The charger can include an input current amplifier that is coupled to the current sensor and for monitoring the charging current. Such sensing method may be accurate when the voltage drop on the sense element is relatively big, e.g., greater than 50 mV. However, problems may occur when the charger controls a relatively small charging current, e.g., during wake-up charging, trickle charging, or end of charging.

One of the issues is caused by an offset of the input current amplifier, which can be in the range of 2 mV-3 mV. For example, when the charging current is relatively small, the sensing error may reach up to 100%.

SUMMARY

In one embodiment, a power converter includes a high-side switch coupled to a power supply terminal and selectively coupled to ground via a conduction path. During an on state duration, the high-side switch is enabled and the conduction path is disabled. During an off state duration, the high-side switch is disabled and the conduction path is enabled. During a skip state duration, the high-side switch and the conduction path both are disabled. The power converter further includes a controller coupled to the high-side switch. The controller is configured to control the on state duration and the skip state duration based on a current reference. The controller is further configured to generate a first control signal for controlling the high-side switch and the conduction path according to the on state duration and the skip state duration, and adjust an output current of the power converter to the current reference according to the first control signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power converter that converts input power to output power at a different level. An output voltage/current of the power converter can be used to charge a battery or power a load. The power converter includes a high-side switch and a conduction path (or a low-side switch) coupled to the high-side switch. The high-side switch is coupled to a power source providing the input power and is selectively coupled to ground via the conduction path. During an on state duration, the high-side switch is enabled (turned on) and the conduction path is disabled (cut off). During an off state duration, the high-side switch is disabled (turned off) and the conduction path is enabled. During a skip state duration, the high-side switch and the conduction path both are disabled (cut off).

Advantageously, the output current of the power converter can be controlled in different ways depending on the level of the output current. When the output current is relatively large, e.g., greater than a threshold, or when the output current is to be adjusted to a relatively large current reference, the power converter can adjust the output current by sensing the output current using an amplifier and by comparing the sensed output current with the current reference. When the output current is relatively small, e.g., less than a threshold, or when the output current is to be adjusted to a relatively small current reference, the power converter can adjust the output current by controlling the on state duration and the skip sate duration according to the current reference. For example, a controller can calculate or adjust the on state duration and the skip state duration according to the current reference and generate corresponding control signals to control the high-side switch and the conduction path. Consequently, the output current can be adjusted to the current reference in a relatively accurate way.

Figure 1:
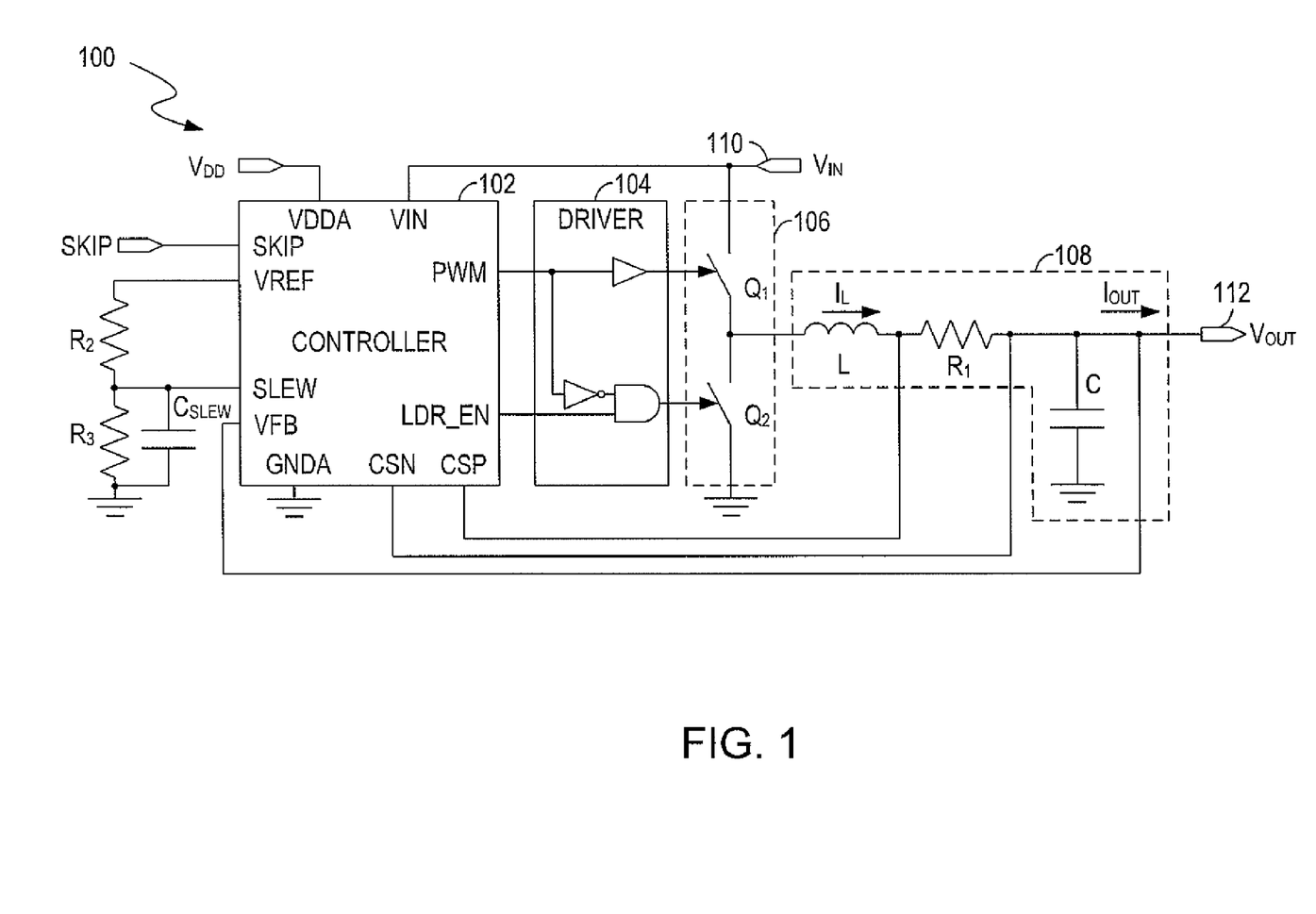
FIG. 1 illustrates a block diagram example of a power converter, in accordance with one embodiment of the present invention.

FIG. 1 illustrates a block diagram example of a power converter 100, in accordance with one embodiment of the present invention. In one embodiment, the power converter 100 is a DC to DC converter. However, the invention is not so limited. The invention can also be well suited in other types of converters. As shown in FIG. 1, the DC to DC converter 100 can receive an input voltage $V_{IN}$ at terminal 110 and generate an output voltage $V_{OUT}$ at terminal 112. The DC to DC converter 100 can include a controller 102, a driver 104, a pair of switches 106 (including a high-side switch $Q_1$ and a low-side switch $Q_2$) and a low pass filter 108. The low pass filter 108 can include an inductor L and a capacitor C. The output voltage $V_{OUT}$ at terminal 112 can be used to power a load or charge a battery.

In one embodiment, the high-side switch $Q_1$ is coupled to a power supply terminal 110 and selectively coupled to ground via the low-side switch $Q_2$. During an on state duration $T_{ON}$, the high-side switch $Q_1$ can be enabled (turned on) and the low-side switch $Q_2$ can be disabled (turned off). During an off state duration $T_{OFF}$, the high-side switch $Q_1$ can be disabled (turned off) and the low-side switch $Q_2$ can be enabled (turned on). During a skip state duration $T_{SKIP}$, the high-side switch $Q_1$ and the low-side switch $Q_2$ both can be disabled (turned off). The controller 102 that is coupled to the high-side switch $Q_1$ via the driver 104 can control the durations $T_{ON}$, $T_{OFF}$ and $T_{SKIP}$ based on a current reference $I_{REF}$. The controller 102 can also generate a first control signal, e.g., a pulse width modulation (PWM) signal from a terminal PWM of the controller 102, to control the high-side switch $Q_1$ and the low-side switch $Q_2$ according to the durations $T_{ON}$, $T_{OFF}$ and $T_{SKIP}$. Additionally, the controller 102 can generate a second control signal, e.g., a low-side switch enable (LDR_EN) signal from a terminal LDR_EN of the controller 102, to control the low-side switch $Q_2$ according to the durations $T_{ON}$, $T_{OFF}$ and $T_{SKIP}$. As such, the controller 102 can adjust an output current $I_{OUT}$ of the power converter 100 to the current reference $I_{REF}$ according to the PWM signal and the LDR_EN signal.

Specifically, if the LDR_EN signal is logic high, the state of the PWM signal can control the switches $Q_1$ and $Q_2$. For instance, the switch $Q_1$ can be turned on and the switch $Q_2$ can be turned off if the PWM signal is logic high. The switch $Q_1$ can be turned off and the switch $Q_2$ can be turned on if the PWM signal is logic low. In addition, if the LDR_EN signal is logic low and the PWM signal is logic high, the switch $Q_1$ can be turned on and the switch $Q_2$ can be turned off. However, if the PWM signal is logic low in this instance, the switches $Q_1$ and $Q_2$ both can be turned off.

In other words, in one embodiment, during the on state duration $T_{ON}$, the PWM signal is logic high and the LDR_EN signal can be logic high or logic low. During the off state duration $T_{OFF}$, the PWM signal is logic low and the LDR_EN signal is logic high. During the skip state duration $T_{SKIP}$, the PWM signal and the LDR_EN signal both are logic low.

In one embodiment, the inductor L is coupled to the high-side switch $Q_1$ and the low-side switch $Q_2$, such that the switch end of the inductor L can be alternately coupled to the power supply terminal 110 and ground depending on the state of the switches $Q_2$ and $Q_1$.

More specifically, during the on state duration $T_{ON}$, the inductor L can be coupled to the power supply terminal 110. Neglecting the voltage drop on the sense resistor $R_1$ which has relatively low resistance, the voltage difference between the terminals of the inductor L can be approximately equal to the input voltage $V_{IN}$ at the power supply terminal 110 less the output voltage $V_{OUT}$ at the output terminal 112. In one embodiment, the input voltage $V_{IN}$ is greater than the output voltage $V_{OUT}$, so there is a net positive voltage across the inductor L. As such, the inductor current $I_L$ can ramp up (increase) according to equation (1) as shown below:

$$di/dt=(V_{IN}-V_{OUT})/L=\Delta I_1/T_{ON}, \quad (1)$$

where $\Delta I_1$ is the change of the inductor current $I_L$ during the on state duration $T_{ON}$.

In addition, during the off state duration $T_{OFF}$, the inductor L can be coupled to ground and there can be a net negative voltage $-V_{OUT}$ across the inductor L. As such, the inductor current $I_L$ can ramp down (decrease) according to equation (2) as shown below:

$$di/dt=V_{OUT}/L=\Delta I_2/T_{OFF}, \quad (2)$$

where $\Delta I_2$ is the change of the inductor current $I_L$ during the off state duration $T_{OFF}$. Furthermore, during the skip state duration $T_{SKIP}$, since both of the switches $Q_1$ and $Q_2$ are turned off, the switching side of the inductor L can be left floating. As such, the inductor current $I_L$ can be approximately zero. As used herein, "approximately zero" means that the current $I_L$ may be different from zero so long as a leakage current that may flow through the inductor L when switches $Q_1$ and $Q_2$ are off is relatively small and can be omitted.

In one embodiment, the controller 102 can adjust a limit, e.g., a peak current level $I_{PK}$, of the inductor current $I_L$ according to the on state duration $T_{ON}$, the input voltage $V_{IN}$ and the output voltage $V_{OUT}$. For example, according to equation (1), the current change $\Delta I_1$ during the on state duration $T_{ON}$ can be given by:

$$\Delta I_1=T_{ON}*(V_{IN}-V_{OUT})/L. \quad (3)$$

Assume that the level of the current change $\Delta I_1$ is the peak current level $I_{PK}$, the peak current level $I_{PK}$ can be given by:

$$I_{PK}=T_{ON}*(V_{IN}-V_{OUT})/L. \quad (4)$$

In one such embodiment, during the on state duration $T_{ON}$, the inductor current $I_L$ can increase from zero to the peak current level $I_{PK}$. If the input voltage $V_{IN}$ and the output voltage $V_{OUT}$ are determined, the peak current level $I_{PK}$ can increase as the on state duration $T_{ON}$ increases, and can decrease as the on state duration $T_{ON}$ decreases.

Similarly, according to equation (2), the current change $\Delta I_2$ during the off state duration $T_{OFF}$ can be given by:

$$\Delta I_2=T_{OFF}*V_{OUT}/L. \quad (5)$$

Advantageously, the controller 102 can control the off state duration $T_{OFF}$ according to the on state duration $T_{ON}$, the input voltage $V_{IN}$ and the output voltage $V_{OUT}$, such that the inductor current $I_L$ can decrease from the peak current level $I_{PK}$ to zero during the off state duration $T_{OFF}$. In one such embodiment, according to equation (5), the peak current level $I_{PK}$ can also be given by:

$$I_{PK}=T_{OFF}*V_{OUT}/L. \quad (6)$$

Based on equations (4) and (6), the following equation can be obtained:

$$T_{OFF}=T_{ON}*(V_{IN}-V_{OUT})/V_{OUT}. \quad (7)$$

In other words, the controller 102 can control the off state duration $T_{OFF}$ proportional to the on state duration $T_{ON}$ based on equation (7).

Figure 2:
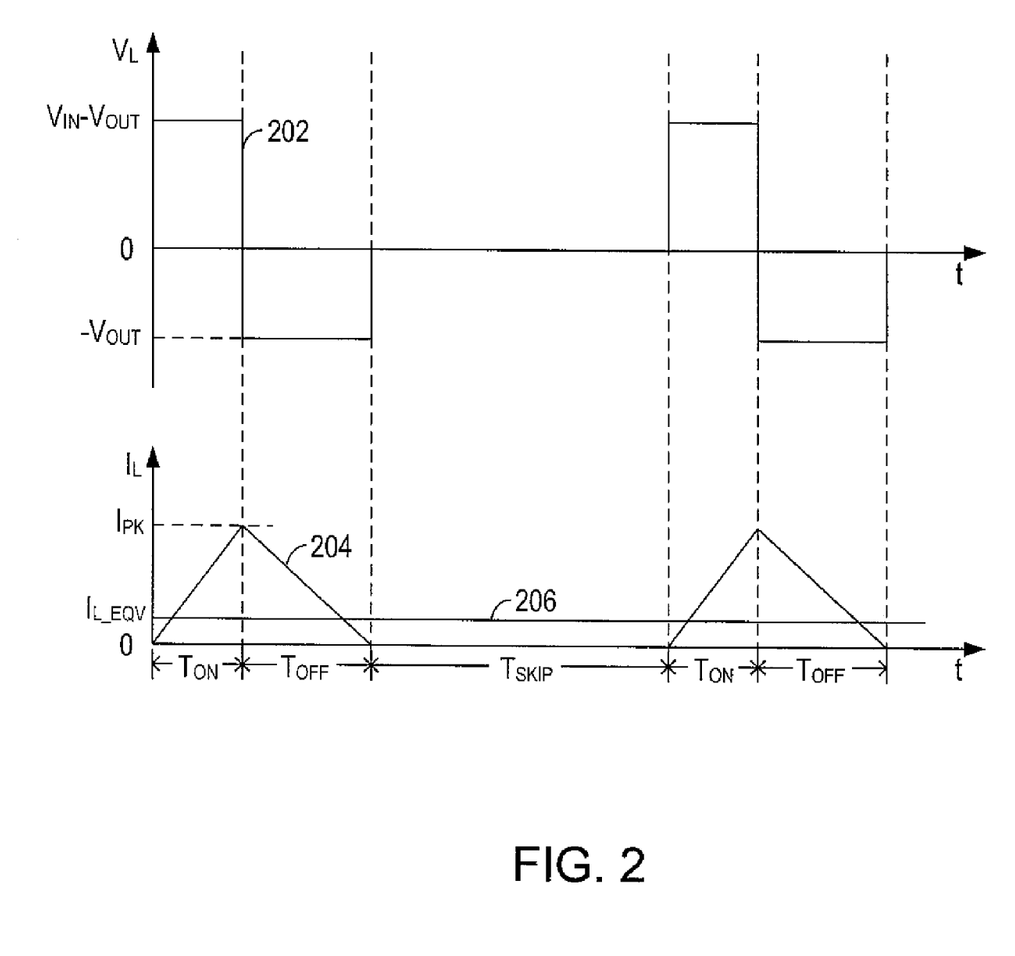
FIG. 2 illustrates plot examples of an inductor voltage, an inductor current and an equivalent level of the inductor current, in accordance with one embodiment of the present invention.

FIG. 2 illustrates plot examples of the inductor voltage $V_L$ across the inductor L, the inductor current $I_L$ and an equivalent level $I_{L\_EQV}$ of the inductor current $I_L$, in accordance with one embodiment of the present invention. FIG. 2 is described in combination with FIG. 1.

Plots 202, 204 and 206 respectively show the waveforms of the inductor voltage $V_L$, the inductor current $I_L$ and the equivalent level $I_{L\_EQV}$ of the inductor current $I_L$, in one embodiment. Specifically, during the on state duration $T_{ON}$, the inductor voltage $V_L$ can be equal to $V_{IN}-V_{OUT}$, and the inductor current $I_L$ can increase. During the off state duration $T_{OFF}$, the inductor voltage $V_L$ can be equal to $-V_{OUT}$, and the inductor current $I_L$ can decrease. The inductor current $I_L$ can have a current limit, e.g., the peak current level $I_{PK}$, determined by the on state duration $T_{ON}$, the input voltage $V_{IN}$ and the output voltage $V_{OUT}$. During the skip state duration $T_{SKIP}$, the inductor current $I_L$ and inductor voltage $V_L$ can be approximately zero.

According to the waveform 204 for the inductor current $I_L$, the equivalent level $I_{L\_EQV}$ of the inductor current $I_L$ can be given by:

$$I_{L\_EQV} = (I_{PK}/2) * (T_{ON} + T_{OFF})/(T_{ON} + T_{OFF} + T_{SKIP}) \quad (8)$$

When equations (4) and (7) are substituted into equation (8), the following equation can be obtained:

$$\begin{aligned} I_{L\_EQV} &= [(V_{IN} - V_{OUT})/(2*L)] * \\ &\quad T_{ON}/[1 + (V_{OUT}/V_{IN})*(T_{SKIP}/T_{ON})] \\ &= K_1 * T_{ON}/[1 + K_2 * (T_{SKIP}/T_{ON})], \end{aligned} \quad (9)$$

where $K_1$ is a parameter that is equal to $(V_{IN}-V_{OUT})/(2*L)$, and $K_2$ is a parameter that is equal to $V_{OUT}/V_{IN}$. As such, the equivalent current $I_{L\_EQV}$ can be controlled by adjusting the on state duration $T_{ON}$ and/or the skip state duration $T_{SKIP}$. In one embodiment, the output current $I_{OUT}$ is equal to $I_{L\_EQV}$.

Referring back to FIG. 1, if the skip state duration $T_{SKIP}$ is determined or fixed, the controller 102 can increase the equivalent current $I_{L\_EQV}$ by increasing the on state duration $T_{ON}$, and also can decrease the equivalent current $I_{L\_EQV}$ by decreasing the on state duration $T_{ON}$. If the on state duration $T_{ON}$ is determined or fixed, the equivalent current $I_{L\_EQV}$ can decrease as the skip state duration $T_{SKIP}$ increases, and can increase as the skip state duration $T_{SKIP}$ decreases. In other words, based on equation (9), by setting the equivalent current $I_{L\_EQV}$ to the current reference $I_{REF}$, the controller 102 or a processor (not shown in FIG. 1) can calculate the on state duration $T_{ON}$ and/or the skip state duration $T_{SKIP}$. As such, the controller 102 can control the PWM signal and the LDR_EN signal based on the calculated durations $T_{ON}$ and $T_{SKIP}$, so as to adjust the equivalent current $I_{L\_EQV}$ to the current reference $I_{REF}$.

In one embodiment, the controller 102 can vary the peak current level $I_{PK}$ by varying the on state duration $T_{ON}$. In another embodiment, the controller 102 can be a constant-ripple-current (CRC) controller that controls the power converter 100 to generate a current $I_L$ having a constant peak current level $I_{PK}$. Specifically, the controller 102 can control the on state duration $T_{ON}$ inversely proportional to the input voltage $V_{IN}$ less the output voltage $V_{OUT}$. For example, the on state duration $T_{ON}$ can be given by:

$$T_{ON} = K/(V_{IN} - V_{OUT}), \quad (10a)$$

where K is a programmable constant parameter. The controller 102 can also control the off state duration $T_{OFF}$ inversely proportional to the output voltage $V_{OUT}$. For example, the off state duration $T_{OFF}$ can be given by:

$$T_{OFF} = K/V_{OUT}. \quad (10b)$$

As such, according to equation (4) or equation (6), the following equation can be obtained:

$$I_{PK} = K/L. \quad (11)$$

As a result, the inductor current $I_L$ can have a constant peak current level $I_{PK}$.

When equations (10a), (10b) and (11) are substituted into equation (8), the following equation can be obtained:

$$I_{L\_EQV} = K^2 * V_{IN}/[2*L*(K*V_{IN} + T_{SKIP}*V_{OUT}*(V_{IN} - V_{OUT}))]. \quad (12)$$

In one such embodiment, if the input voltage $V_{IN}$ and the output voltage $V_{OUT}$ are determined, e.g., the input voltage $V_{IN}$ is obtained via the VIN terminal of the controller 102 and the output voltage $V_{OUT}$ is obtained via the VFB terminal of the controller 102, the controller 102 can adjust the equivalent current $I_{L\_EQV}$ by controlling the skip state duration $T_{SKIP}$.

Moreover, the controller 102 can have a target input terminal SLEW where the desired output voltage $V_{OUT}$ is set. In one embodiment, the slew capacitor $C_{SLEW}$ coupled to the terminal SLEW charges based on the value of the resistors in the resistor divider $R_2/R_3$ and the value of the reference voltage at a $V_{REF}$ terminal of the controller 102. Various ways can be used to charge the slew capacitor $C_{SLEW}$ and create a target voltage signal $V_{TARGET}$ at the terminal SLEW. In addition, the terminal VFB of the controller 102 can receive a feedback signal representative of the output voltage level $V_{OUT}$. The controller 102 can include a comparator for comparing the output voltage level $V_{OUT}$ with the target voltage level $V_{TARGET}$, so as to adjust the output voltage level $V_{OUT}$ to the target voltage level $V_{TARGET}$. Furthermore, an optional sense resistor $R_1$ or an inductor DCR (direct current resistance) current sensing circuit (not shown in FIG. 1) can be utilized to provide feedback voltage levels to terminals CSN and CSP of the controller 102, so as to represent the inductor current level $I_L$. For example, the difference between the voltage levels at the terminals CSN and CSP is proportional to the inductor current level $I_L$.

In one embodiment, the output terminal 112 is coupled to a load to power the load. In another embodiment, the output terminal 112 is coupled to a battery to charge the battery. In one such embodiment, the output current $I_{OUT}$, e.g., $I_{L\_EQV}$, can be used to charge the battery. In one embodiment, the power converter 100 can charge the battery in different charging modes, e.g., a normal current charging mode and a small current charging mode, etc.

In the normal current charging mode, the output current $I_{OUT}$ for charging the battery is greater than a predetermined threshold (e.g., when a voltage drop on the sense resistor $R_1$ is higher than a predetermined level (e.g., 50 mV)). In the example of FIG. 1, the sense resistor $R_1$ is coupled between the inductor L and the capacitor C, so as to provide a current feedback indicating the inductor current $I_L$. In another embodiment, the sense resistor $R_1$ can be coupled between the capacitor C and the output terminal 112, so as to provide a current feedback indicating the output current $I_{OUT}$. The controller 102 can sense the inductor current $I_L$ or the output current $I_{OUT}$ via the terminals CSN and CSP by an amplifier in the controller 102 and compare the sensed current with a current reference $I'_{REF}$. The current reference $I'_{REF}$ can be greater than the current reference $I_{REF}$. A duty cycle of the PWM signal controlling the switches $Q_1$ and $Q_2$ can be adjusted according to a result of the current comparison so as to adjust the output current $I_{OUT}$ to the current reference $I'_{REF}$. In addition, the controller 102 can compare a feedback voltage $V_{FB}$ at the terminal VFB with a target voltage $V_{TARGET}$ at the terminal SLEW. The duty cycle of the PWM signal can also be adjusted according to a result of the voltage comparison so as to adjust the output voltage $V_{OUT}$ to the target voltage $V_{TARGET}$.

In the small current charging mode (e.g., during wake-up charging, trickle charging, and end of charging, etc.), the output current $I_{OUT}$ for charging the battery is relatively small, e.g., less than a predetermined threshold. Advantageously, instead of sensing the current via the sense resistor $R_1$, the controller 102 can calculate or adjust durations $T_{ON}$, $T_{OFF}$, and $T_{SKIP}$ based on the current reference $I_{REF}$. Thus, the controller 102 can adjust the output current $I_{OUT}$ to the current reference $I_{REF}$. For example, according to equation (9), if the on state duration $T_{ON}$ is determined or fixed, by controlling the skip state duration $T_{SKIP}$ to a certain value, e.g., by controlling an input signal at a terminal SKIP of the controller 102 or calculating/adjusting the $T_{SKIP}$ by a timer delay circuit in the controller 102, the output current $I_{OUT}$ can be controlled to the current reference level $I_{REF}$.

Figure 3:
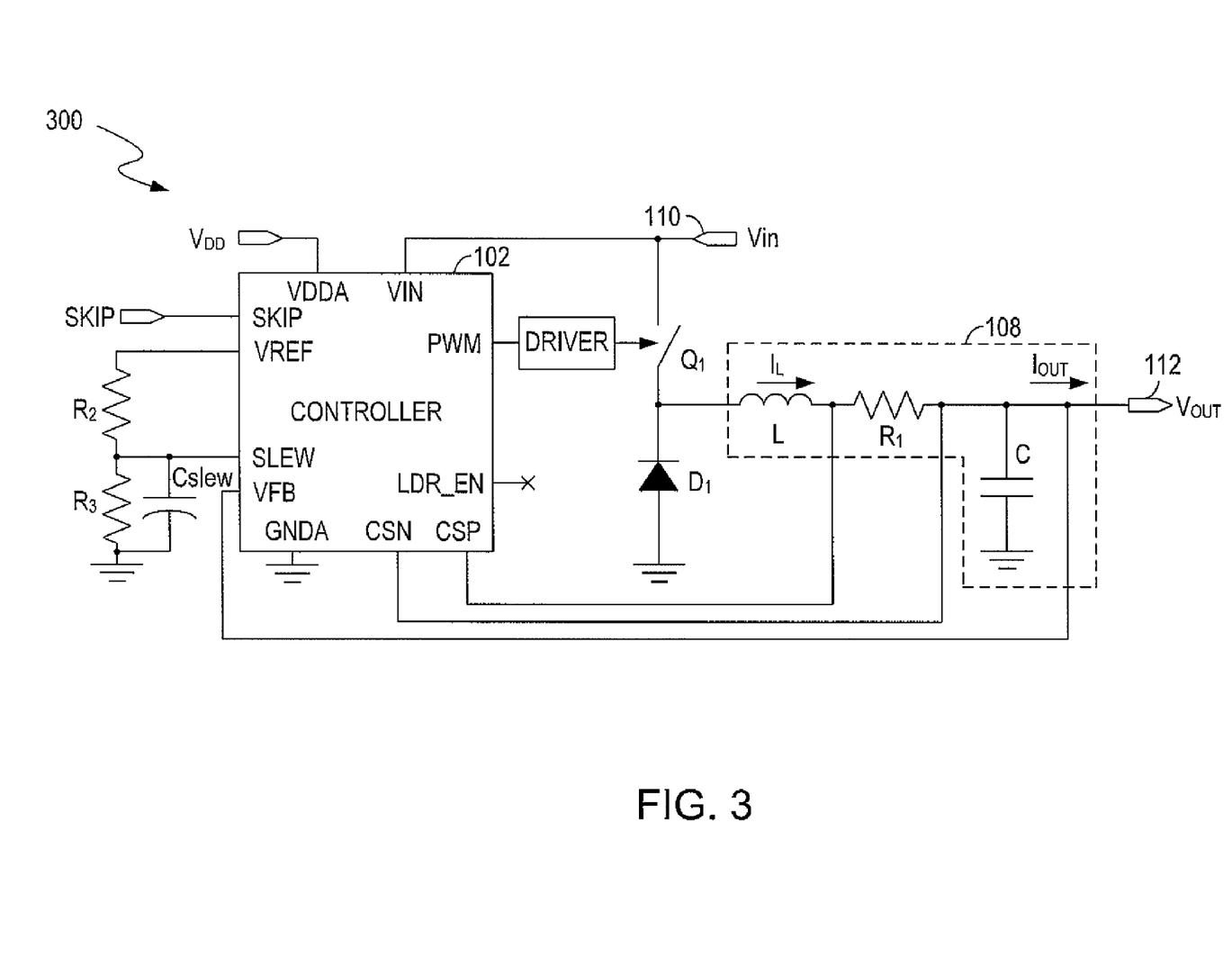
FIG. 3 illustrates a block diagram example of a power converter, in accordance with one embodiment of the present invention.

FIG. 3 illustrates a block diagram example of a power converter 300, in accordance with another embodiment of the present invention. Elements that are labeled the same as in FIG. 1 have similar functions. As shown in FIG. 3, the high-side switch $Q_1$ is coupled to ground via a conduction path. The conduction path can include a diode $D_1$ having a P terminal coupled to the high-side switch $Q_1$ and having an N terminal coupled to ground. In one such embodiment, the low-side switch $Q_2$ in the example of FIG. 1 can be omitted.

In the example of FIG. 3, during the on state duration $T_{ON}$, the PWM signal can be logic high so as to turn on the high-side switch $Q_1$, and the diode $D_1$ can be cut off. Meanwhile, the inductor current $I_L$ can increase from zero to the peak current level $I_{PK}$. During the off state duration $T_{OFF}$, the PWM signal can be logic low so as to turn off the high-side switch $Q_1$. The diode $D_1$ can be in conduction, and the inductor current $I_L$ can flow through the diode $D_1$ from ground to the inductor L. Meanwhile, the inductor current $I_L$ can decrease from the peak current level $I_{PK}$ to zero. During the skip state duration $T_{SKIP}$, the PWM signal can still be logic low. As such, the high-side switch $Q_1$ and the diode $D_1$ both can be cut off, and the inductor current $I_L$ can be approximately zero. Similarly, according to equation (9), the output current $I_{OUT}$ can be adjusted properly by controlling the on state duration $T_{ON}$ and the skip state duration $T_{SKIP}$.

Figure 4:
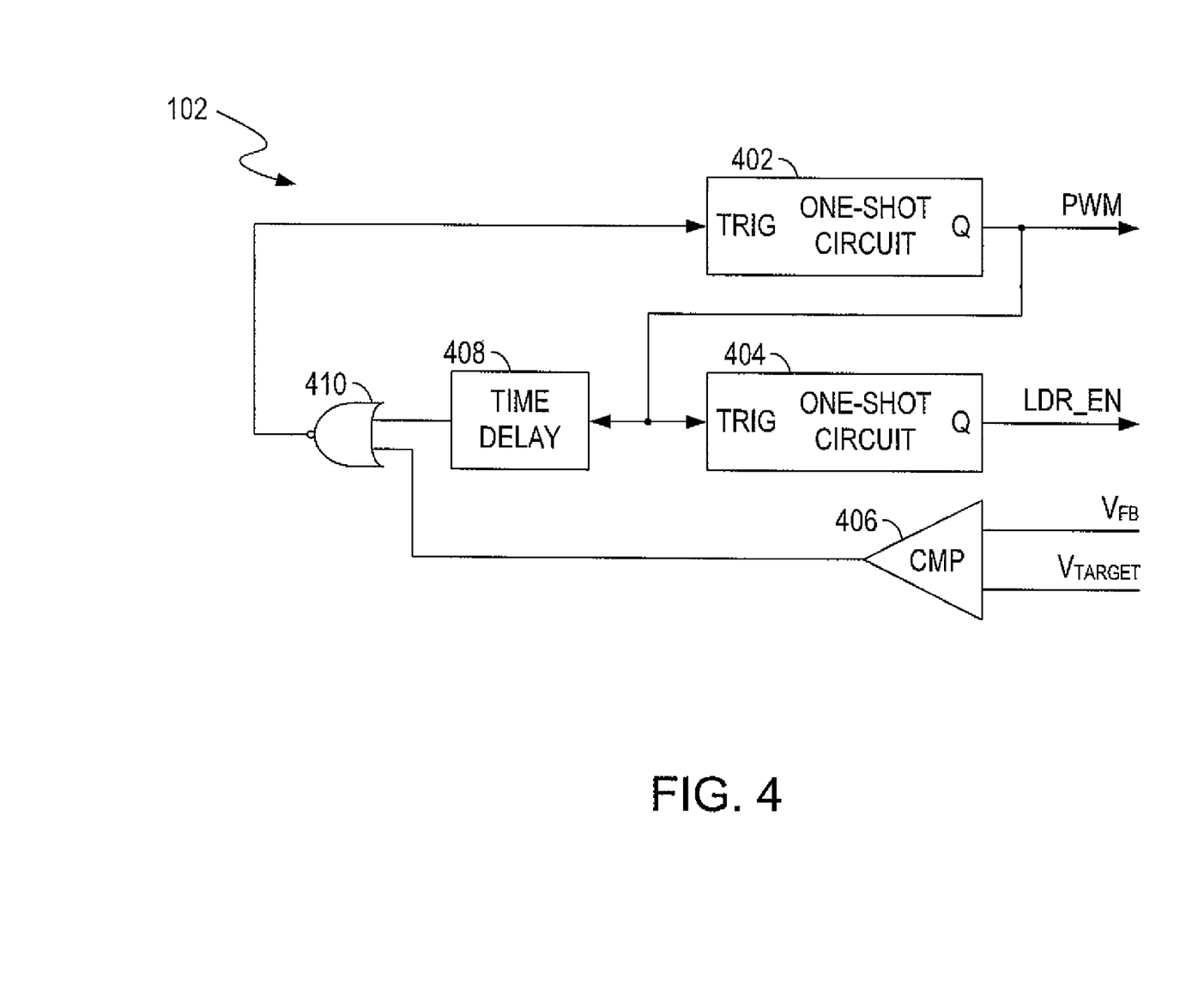
FIG. 4 illustrates a block diagram example of part of a controller in a power converter, in accordance with one embodiment of the present invention.

FIG. 4 illustrates a block diagram example of part of the controller 102, in accordance with one embodiment of the present invention. FIG. 4 is described in combination with FIG. 1 and FIG. 3. As shown in FIG. 4, the controller 102 can provide a PWM control signal and an LDR_EN signal to the driver 104 (in FIG. 1), so as to control the high-side switch $Q_1$ and the low-side switch $Q_2$. In one embodiment, the controller 102 can count blocks of time and provide the appropriate PWM control signal and the LDR_EN signal based on such counts.

For instance, the controller 102 can include a one-shot circuit 402, a one-shot circuit 404, a comparator 406, a time delay circuit 408, and a NOR gate 410. The one-shot circuit 402 can provide the PWM control signal and the one-shot circuit 404 can provide the LDR_EN signal. The one-shot circuits 402 and 404 can be triggered by falling edges of the input signals. For example, if the input signal at the terminal TRIG of the one-shot circuit 402 changes from logic high to logic low, the one-shot circuit 402 can output a PWM signal that is logic high for a time interval, e.g., an on state duration $T_{ON}$. When the time interval $T_{ON}$ expires, the PWM signal can change to logic low. Similarly, if the input signal at the terminal TRIG of the one-shot circuit 404 changes from logic high to logic low, the one-shot circuit 404 can output an LDR_EN signal that is logic high for a time interval, e.g., an off state duration $T_{OFF}$. When the time interval $T_{OFF}$ expires, the LDR_EN signal can change to logic low.

The time delay circuit 408 can be a blanking circuit for generating retriggering of the one-shot circuit 402. For example, the time delay circuit 408 can receive the PWM signal from the one-shot circuit 402, and can be reset by a falling edge of the PWM signal. If the PWM signal changes from logic high to logic low, a timer in the time delay circuit 408 can start to run. The time delay circuit 408 can output logic high to the NOR gate 410 when a time interval, e.g., an off state duration $T_{OFF}$ plus a skip state duration $T_{SKIP}$ ($T_{OFF}+T_{SKIP}$), expires. As such, the NOR gate 410 can output logic low to trigger the one-shot circuit 402. Moreover, the terminal TRIG of the one-shot circuit 404 can receive the PWM signal from the one-shot circuit 402. Thus, if the PWM signal changes from logic high to logic low, the one-shot circuit 404 can be triggered.

The comparator 406 can compare a feedback voltage $V_{FB}$ at the terminal VFB of the controller 102 and a target voltage $V_{TARGET}$ at the terminal SLEW of the controller 102, so as to generate an output signal to the NOR gate 410. In one embodiment, if the feedback voltage $V_{FB}$ is no less than the target voltage $V_{TARGET}$, the output signal can be logic low. If the feedback voltage $V_{FB}$ is less than the target voltage $V_{TARGET}$, the output signal can be logic high, such that the NOR gate 410 can output logic low to trigger the one-shot circuit 402. At this moment, the PWM signal can be logic high so as to turn on the high-side switch $Q_1$ (in FIG. 1 and FIG. 3), and the output voltage $V_{OUT}$ can increase. Thus, the output voltage $V_{OUT}$ can be adjusted to the target voltage $V_{TARGET}$, in one embodiment.

In one embodiment, during the normal current charging mode as mentioned above, the controller 102 can enable the comparator 406 so as to adjust the output voltage $V_{OUT}$ to the target voltage $V_{TARGET}$. During the small current charging mode, the controller 102 can disable the comparator 406, and adjust the output current $I_{OUT}$ by controlling the on state duration $T_{ON}$, the off state duration $T_{OFF}$ and the skip state duration $T_{SKIP}$.

In one embodiment, the controller 102 in FIG. 4 can be implemented in the power converter 100 in FIG. 1, so as to control the high-side switch $Q_1$ and the low-side switch $Q_2$. In another embodiment, the controller 102 in FIG. 4 can also be implemented in the power converter 300 in FIG. 3, so as to control the high-side switch $Q_1$ and the diode $D_1$. In one such embodiment, the output terminal Q of the one-shot circuit 404 can be left floating.

Figure 5:
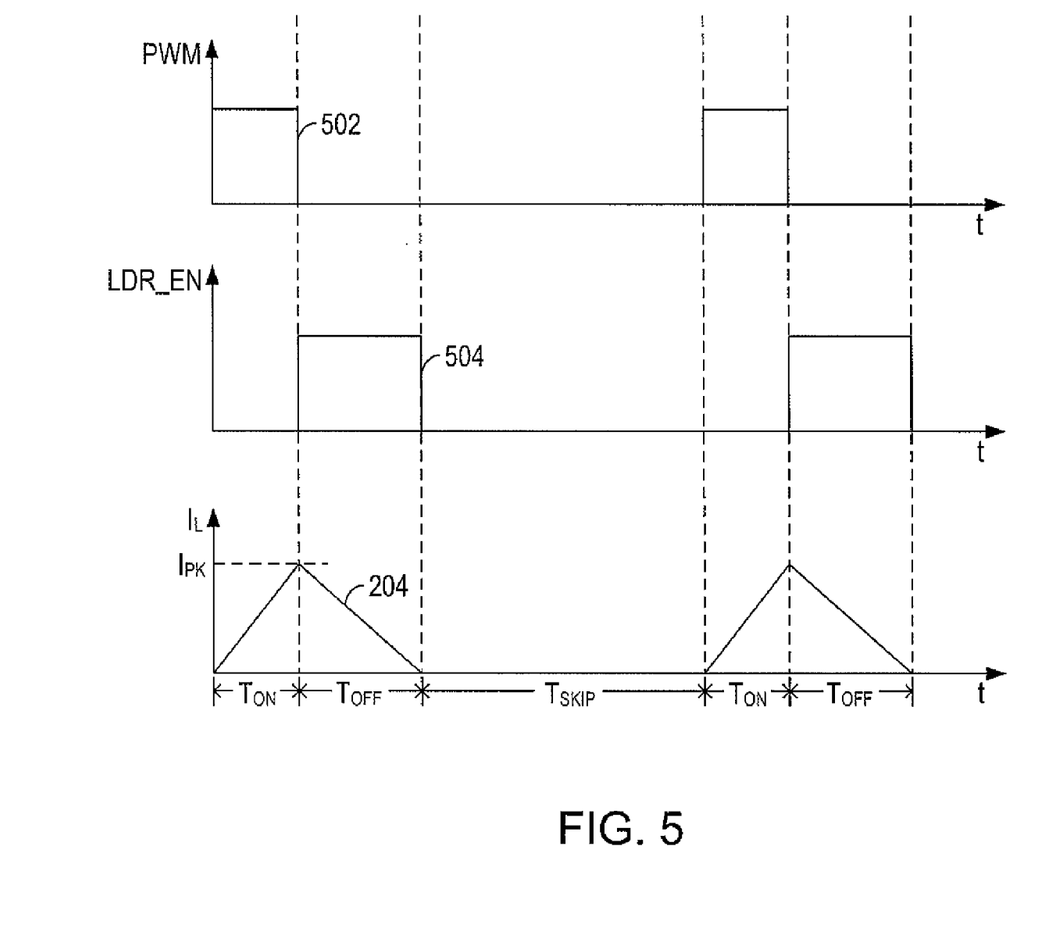
FIG. 5 illustrates plot examples of a first control signal, a second control signal and an inductor current, in accordance with one embodiment of the present invention.

FIG. 5 illustrates plot examples of a first control signal (the PWM signal), a second control signal (the LDR_EN signal) and the inductor current $I_L$, in accordance with one embodiment of the present invention. FIG. 5 is described in combination with FIG. 4.

As shown in FIG. 5, plots 502 and 504 respectively show the waveforms of the PWM signal and the LDR_EN signal. When the one-shot circuit 402 is triggered, the PWM signal can be logic high for a time interval $T_{ON}$. During the time interval $T_{ON}$, the inductor current $I_L$ can increase. When the PWM signal changes from logic high to logic low, the one-shot circuit 404 can be triggered and the time delay circuit 408 can be reset. For example, the LDR_EN signal can change from logic low to logic high and last for a time interval $T_{OFF}$, and then change to logic low when the time interval $T_{OFF}$ expires. During the time interval $T_{OFF}$, the inductor current $I_L$ can decrease. The time delay circuit 408 can be reset and start to count the time. When a time interval $T_{OFF}+T_{SKIP}$ expires, the time delay circuit 408 can output logic high to trigger the one-shot circuit 402, so as to change the PWM signal to logic high. During the time interval $T_{SKIP}$, the inductor current $I_L$ can be approximately zero.

Figure 6:
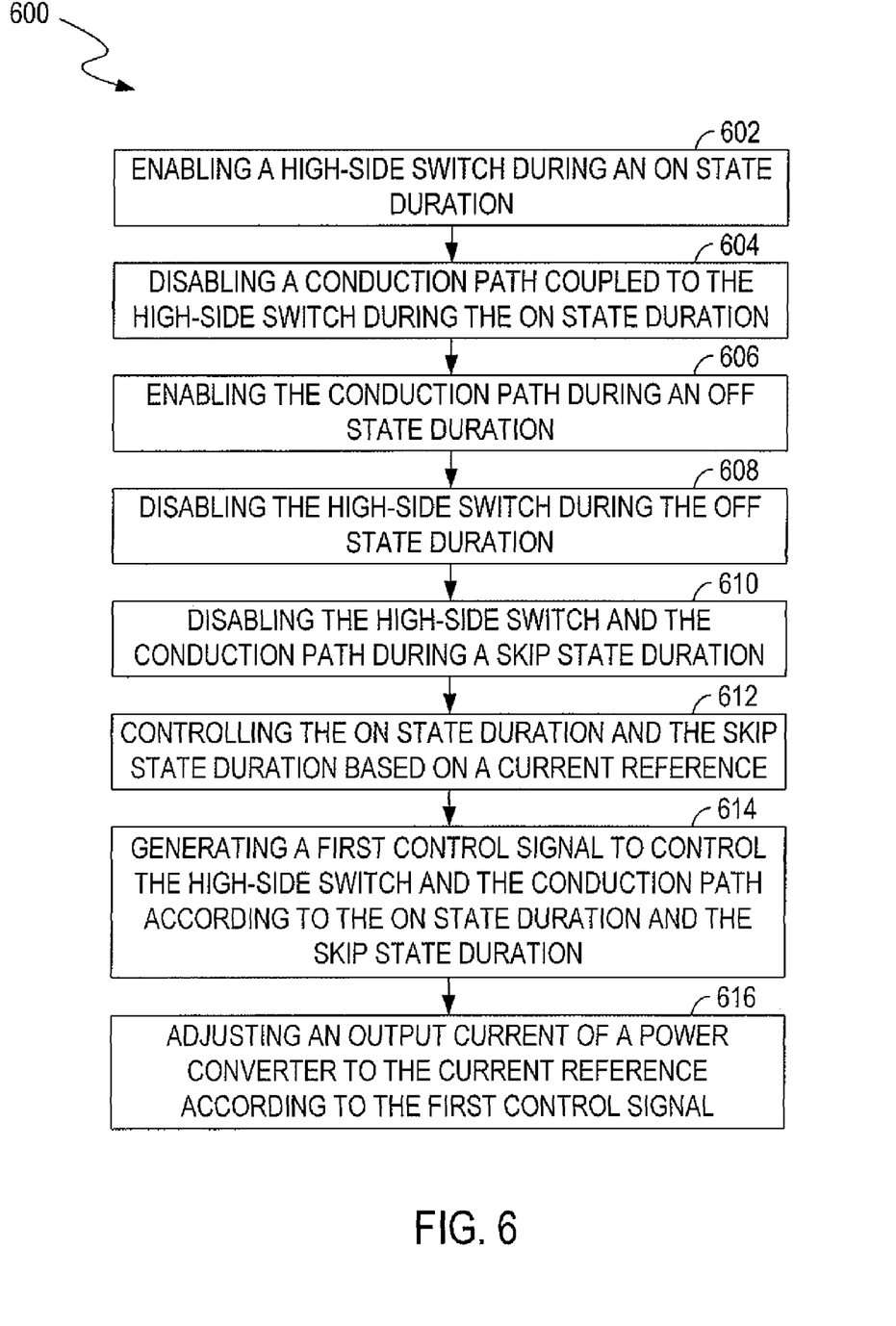
FIG. 6 illustrates a flowchart example of operations performed by a power converter, in accordance with one embodiment of the present invention.

FIG. 6 illustrates a flowchart 600 of examples of operations performed by a power converter 100/300, in accordance with one embodiment of the present invention. FIG. 6 is described in combination with FIG. 1, FIG. 2 and FIG. 3.

In blocks 602 and 604, the controller 102 can enable (turn on) the high-side switch $Q_1$ and disable (cut off) a conduction path, e.g., the low-side switch $Q_2$ or the diode $D_1$, that is coupled to the high-side switch $Q_1$ during the on state duration $T_{ON}$. In blocks 606 and 608, the controller 102 can enable the conduction path $D_1/Q_2$, and disable the high-side switch $Q_1$ during the off state duration $T_{OFF}$. In block 610, the controller 102 can disable the high-side switch $Q_1$ and the conduction path $D_1/Q_2$ during the skip state duration $T_{SKIP}$.

In block 612, the controller 102 can control the on state duration $T_{ON}$ and the skip state duration $T_{SKIP}$ based on the current reference $I_{REF}$. For example, based on equation (9), the controller 102 can calculate the on state duration $T_{ON}$ and/or the skip state duration $T_{SKIP}$ based on the current reference level $I_{REF}$.

In block 614, the controller 102 can generate a first control signal, e.g., the PWM signal, to control the high-side switch $Q_1$ and the conduction path $D_1/Q_2$ according to the on state duration $T_{ON}$ and the skip state duration $T_{SKIP}$. As such, as described in block 616, the controller 102 can adjust the output current $I_{OUT}$ of the power converter 100/300, e.g., the equivalent current $I_{L\_EQV}$, to the current reference $I_{REF}$ according to the first control signal.

Accordingly, embodiments according to the present invention provide a power converter that can adjust an output current in differently ways depending on the level of the output current. The power converter can be used in many applications, e.g., a battery charging system and a power supply system, etc. For example, the power converter can provide a supply current to a load, or a charging current to a battery. Advantageously, such power converter can control the supply/charging current to a relatively low level in a relatively accurate way.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A power converter comprising:
   a high-side switch coupled to a power supply terminal and selectively coupled to ground via a conduction path, wherein said high-side switch is enabled and said conduction path is disabled during an on state duration, and wherein said high-side switch is disabled and said conduction path is enabled during an off state duration, and wherein said high-side switch and said conduction path both are disabled during a skip state duration; and
   a controller coupled to said high-side switch and configured to calculate said skip state duration based on a predetermined current reference and an equation, and configured to generate a first control signal for controlling said high-side switch and said conduction path according to said on state duration and said skip state duration that is calculated based on said predetermined current reference and said equation, and configured to adjust an output current of said power converter to said predetermined current reference by controlling said high-side switch and said conduction path using said first control signal.

2. The power converter as claimed in claim 1, wherein said first control signal has a first state during said on state duration, and wherein said first control signal has a second state during said off state duration and said skip state duration.

3. The power converter as claimed in claim 1, wherein said conduction path comprises a low-side switch controlled by a second control signal from said controller, and wherein said second control signal has a first state during said on state duration and said skip state duration, and wherein said second control signal has a second state during said off state duration.

4. The power converter as claimed in claim 1, wherein said conduction path comprises a diode having a P terminal coupled to said high-side switch and having an N terminal coupled to ground.

5. The power converter as claimed in claim 1, further comprising:
   an inductor coupled to said high-side switch and said conduction path, wherein an inductor current through said inductor increases during said on state duration, decreases during said off state duration and is approximately zero during said skip state duration.

6. The power converter as claimed in claim 5, wherein said controller controls said inductor current to have a constant peak current level by controlling said on state duration inversely proportional to an input voltage of said power converter less an output voltage of said power converter.

7. The power converter as claimed in claim 5, wherein said controller controls said inductor current to have a constant peak current level by controlling said off state duration inversely proportional to an output voltage of said power converter.

8. The power converter as claimed in claim 1, wherein said output current decreases as said skip state duration increases.

9. A method for controlling an output current of a power converter, said method comprising:
   enabling a high-side switch during an on state duration;
   disabling a conduction path coupled to said high-side switch during said on state duration;
   enabling said conduction path during an off state duration;
   disabling said high-side switch during said off state duration;
   disabling said high-side switch and said conduction path during a skip state duration;
   calculating said skip state duration based on a predetermined current reference and an equation;
   generating a first control signal to control said high-side switch and said conduction path according to said on state duration and said skip state duration that is calculated based on said predetermined current reference and said equation; and
   adjusting said output current to said predetermined current reference by controlling said high-side switch and said conduction path using said first control signal.

10. The method as claimed in claim 9, wherein said conduction path comprises a low-side switch controlled by a second control signal.

11. The method as claimed in claim 9, further comprising:
    controlling said on state duration inversely proportional to an input voltage of said power converter less an output voltage of said power converter.

12. A controller comprising:
    a signal generator configured to generate a first control signal for controlling a high-side switch and a conduction path coupled to said high-side switch to adjust an output current of a power converter to a predetermined current reference, and configured to generate said first control signal according to an on state duration, an off state duration, and a skip state duration, wherein said high-side switch is enabled and said conduction path is disabled during said on state duration, and wherein said high-side switch is disabled and said conduction path is enabled during said off state duration, and wherein said high-side switch and said conduction path both are disabled during said skip state duration; and a time delay circuit coupled to said signal generator and configured to calculate said skip state duration based on said predetermined current reference and an equation.

13. The controller as claimed in claim 12, wherein said controller controls an inductor current flowing through an inductor that is coupled to said high-side switch and said conduction path based on said on state duration, said off state duration and said skip state duration.

14. The controller as claimed in claim 13, wherein said inductor current increases during said on state duration, and wherein said inductor current decreases during said off state duration, and wherein said inductor current is approximately zero during said skip state duration.

15. The controller as claimed in claim 13, wherein a level of said output current is equal to an equivalent level of said inductor current.

16. The controller as claimed in claim 12, wherein said conduction path comprises a low-side switch controlled by a second control signal from said controller.

17. The controller as claimed in claim 12, wherein said controller controls said off state duration inversely proportional to an output voltage of said power converter.

18. The controller as claimed in claim 12, wherein said controller controls said on state duration inversely proportional to an input voltage of said power converter less an output voltage of said power converter.

19. The controller as claimed in claim 12, wherein said output current decreases as said skip state duration increases.

20. The power converter as claimed in claim 1, wherein said equation is given by:

$$I_{L\_EQV}=[(V_{IN}-V_{OUT})/(2*L)]*T_{ON}/[1+(V_{OUT}/V_{IN})*(T_{SKIP}/T_{ON})],$$

where $I_{L\_EQV}$ represents a level of said predetermined current reference, $V_{IN}$ represents an input voltage of said power converter, $V_{OUT}$ represents an output voltage of said power converter, L represents inductance of an inductor, $T_{ON}$ represents said on state duration, and $T_{SKIP}$ represents said skip state duration.

21. The method as claimed in claim 9, further comprising:
controlling said off state duration inversely proportional to an output voltage of said power converter.

22. The method as claimed in claim 9, wherein said equation is given by:

$$I_{L\_EQV}=[(V_{IN}-V_{OUT})/(2*L)]*T_{ON}/[1+(V_{OUT}/V_{IN})*(T_{SKIP}/T_{ON})],$$

where $I_{L\_EQV}$ represents a level of said predetermined current reference, $V_{IN}$ represents an input voltage of said power converter, $V_{OUT}$ represents an output voltage of said power converter, L represents inductance of an inductor, $T_{ON}$ represents said on state duration, and $T_{SKIP}$ represents said skip state duration.

23. The controller as claimed in claim 12, wherein said equation is given by:

$$I_{L\_EQV}=[(V_{IN}-V_{OUT})/(2*L)]*T_{ON}/[1+(V_{OUT}/V_{IN})*(T_{SKIP}/T_{ON})],$$

where $I_{L\_EQV}$ represents a level of said predetermined current reference, $V_{IN}$ represents an input voltage of said power converter, $V_{OUT}$ represents an output voltage of said power converter, L represents inductance of an inductor, $T_{ON}$ represents said on state duration, and $T_{SKIP}$ represents said skip state duration.

* * * * *